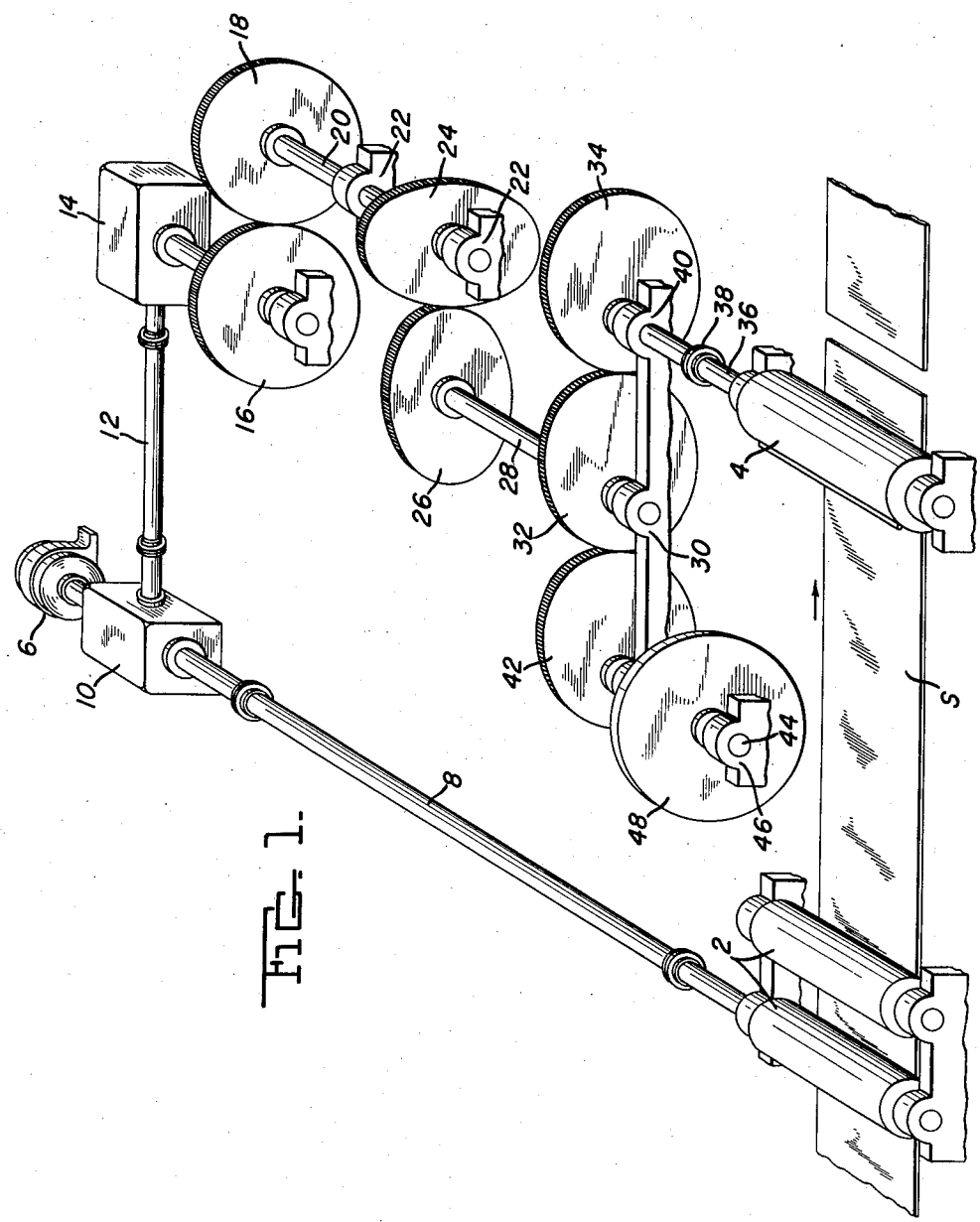

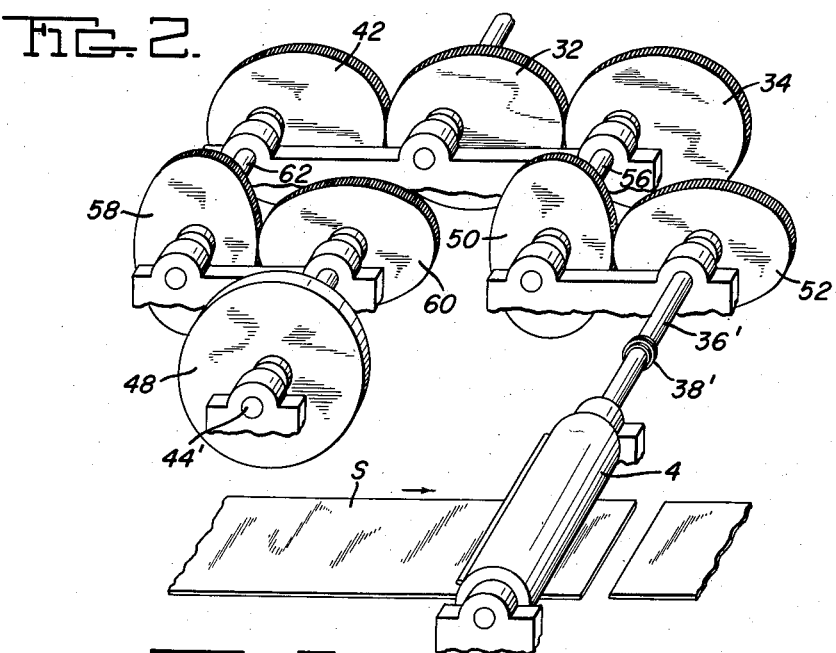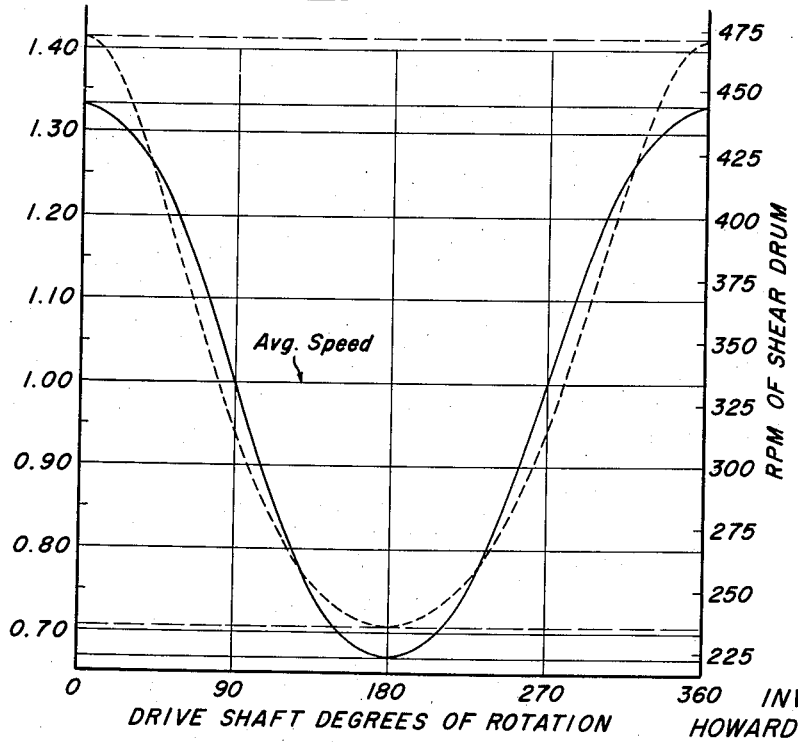

United States Patent Office 2,861,635
Patented Nov. 25, 1958

2,861,635

POWER TRANSMITTING APPARATUS

Howard S. Orr, Pittsburgh, Pa., assignor to United States Steel Corporation, a corporation of New Jersey Application January 27, 1955, Serial No. 484,532

8 Claims. (Cl. 164—68)

This invention relates to power transmitting apparatus and more particularly to power transmitting apparatus for a flying shear having an elliptical gear system incorporated therein. Such shears are commonly used for cutting strip steel into sheets. Shears suitable for this purpose are shown in the patents to Hallden No. 2,180,202, dated November 14, 1939, and Orr No. 2,670,796, dated March 2, 1954. The shear shown in the Hallden patent is suitable for cutting sheets at relatively low speeds but is not suitable for cutting all lengths of sheets at high speed such as 850 feet per minute and above. The shear shown in the Orr patent is suitable for cutting at higher speeds than the shear of the Hallden patent but this shear requires the use of double drums and does not eliminate the basic difficulties discussed hereinafter. Shears of this type are used to cuts sheets from strip electrolytically coated and the speed of the coating line cannot be greater than the speed at which the strip can be sheared into sheets accurately. In some instances in order to obtain greater coating speeds the strip is coiled and then sheared on a separate shear line but this increases the cost of shearing. The can manufacturing companies require sheets of tin plate varying from 18 to 42 inches in length with a tolerance of plus or minus $\frac{1}{16}$ inch. It is frequently impossible to obtain this tolerance on the present shears when operating at high speeds. An elliptical gear system is provided in the shears to vary the speed of the shear drum during its cycle of rotation with the peripheral speed of the shear drum corresponding to the strip speed at the time of cut. A fly wheel is attached to counterbalance the surge of the shear drums but the arrangement is such that the surge is only partially balanced, so that the shafts in the driving system are subjected to a complete torque reversal every 90° of rotation. This lack of counterbalance is a major reason for the inaccuracy in the shears. This lack of balance also causes a large amount of vibration in the system which results in excessive wear in all the moving parts. The present elliptical gear system consists of three focus rotated elliptical gears with the center gear being connected to the drive shaft and the outer gears being connected to the drum and balancing fly wheel, respectively. This arrangement is such that the average speed of the system is not midway between the maximum and minimum speeds. Instead, if the average speed value is taken as 1 for gears with an elliptical ratio of 2 to 1, the minimum speed value will be .707 and the maximum speed 1.414. Hence, if the speed decreases from the maximum it will reach the arithmetic mean speed after approximately 70° of rotation instead of 90°. Since the accelerating torque in ft. lbs. is equal to $$\frac{WR^2}{307} \times \frac{\text{change in R. P. M.}}{\text{time in seconds}}$$

the torque will not vary uniformly throughout the cycle thus resulting in the torque reversal every 90° of rotation. In other words, while the speed curves of the balancing fly wheel and the shear drum are of the same shape they are 180° out of phase with each other so that the torque curve for the balancing fly wheel increases slowly while the torque curve for the drum is decreasing rapidly.

It is therefore an object of my invention to provide a flying shear in which the torque on the drive shaft due to the fly wheel balances the torque on the drive shaft due to the shear drum at all times.

Another object is to provide an elliptical gear system for transmitting power between a constant speed shaft and one or more variable speed shafts with the speed of the constant speed shaft being midway between the maximum and minimum speeds of the variable speed shafts.

These and other objects will be more apparent after referring to the following specification and attached drawings, in which:

Figure 1 is a schematic perspective view of my invention as applied to a flying shear;

Figure 2 is a view, similar to Figure 1, showing a modification; and

Figure 3 is a chart showing the speed curve of the present invention compared with that of the prior art.

Referring more particularly to the drawings, reference numeral 2 indicates the measuring or feed rolls over or under which a strip S passes to a shear drum 4 in the usual manner. While two feed rolls and one drum are shown it will be understood that the number of feed rolls may vary and that a cooperating shear drum is provided in the same vertical plane as drum 4. The measuring rolls 2 are driven from a motor 6 by means of a shaft 8 and a suitable gear box 10. The drum 4 may be driven from the motor 6 through gear box 10. As shown, one end of a shaft 12 is connected to the gear box 10 with the other end of the shaft being connected to a variable speed transmission 14. A spur gear 16 is driven from the transmission 14 and is in mesh with a second spur gear 18. The gear 18 is mounted on a shaft 20 which is rotatably supported in bearings 22. A center rotated elliptical gear 24 is also mounted on the shaft 20 and meshes with a similar center rotated elliptical gear 26 which is mounted on a shaft 28. Shaft 28 is rotatably supported in bearings 30. A focus rotated elliptical gear 32 is also mounted on the shaft 28 for rotation therewith. A second focus rotated gear 34 which is in mesh with the gear 32 is mounted on a shaft 36 and is connected to the drum 4 by means of the shaft 36 and a coupling 38. The shaft 36 is mounted in bearings 40. A third focus rotated elliptical gear 42 is mounted on shaft 44 and is in mesh with the gear 32. The shaft 44 is rotatably mounted in bearings 46. A balancing fly wheel 48 is also mounted on the shaft 44 for rotation therewith. As shown in Figure 1, the axes of rotation of the focus rotated gears 32, 34 and 42 are mounted in a common plane and the center rotated elliptical gears 24 and 26 are mounted 90° out of phase from one another. It will also be seen that the elliptical gears 24, 26, 32, 34 and 42 are so arranged that the minor axis of gear 24 is aligned with the major axis of gear 26 when the maximum and minimum radii of gears 32, 34 and 42 are in the common plane of their axes with the minimum radius of gear 32 being adjacent the maximum radius of gear 42 and the maximum radius of gear 32 being adjacent the minimum radius of gear 34. The characteristics of the gears 24 and 26 are such that they modify the speed characteristics of the focus rotated elliptical gears 32, 34 and 42 so that the speed curves of the drum and fly wheel are identical but 180° out of phase with one another with the sum of the speeds of the drum and fly wheel being equal at all times so that the drive shaft torques balance one another. For example, with focus rotated gears having a maximum pitch radius of 7.2303 in. and a minimum pitch radius of 5.1127 in., the center rotated gears should have a maximum pitch radius of 5.000 in. and a minimum pitch radius of 4.7140 in. or in that ratio. The gears 24, 26, 32 and either gear 34 or 42 constitute a compound elliptical gear system between a constant speed shaft and a variable speed shaft in which the speed of the constant speed shaft is midway between the maximum and minimum speeds of the variable speed shaft. In Figure 3 the broken line curve indicates a characteristic curve for the speed of the shear drum when three focus rotated gears are used and the solid line curve indicates a similar speed curve when the combination of center rotated and focus rotated gears is used. The scale to the left is based upon the average speed being equal to 1 and the scale to the right indicates actual speeds. With an average speed of 333⅓ R. P. M. the maximum speed for the old system is equal to approximately 470 R. P. M. and the minimum speed is equal to approximately 235 R. P. M. while the maximum speed for the new system is equal to 444⅘ R. P. M. and the minimum speed is equal to 222⅖ R. P. M. It will be understood that this gear system may be used in any mechanism where it is advantageous to obtain such speed characteristics. It will also be understood that other mechanism such as shown in the Hallden and Orr patents and in the Orr and Rendel application may be incorporated in the flying shear mechanism shown in Figure 1.

In the embodiment shown in Figure 2 the center rotated elliptical gears 24 and 26 are omitted from their position between the drive motor 6 and the gears 32, 34 and 42 and a similar pair of center rotated elliptical gears 50 and 52 are connected between the gear 34 and drum 4 with the gear 34 being connected to rotate gear 50 through shaft 56 and gear 52 being connected to rotate drum 4 through shaft 36' and coupling 38'. Another set of center rotated elliptical gears 58 and 60 are located between the gear 42 and the fly wheel 48 with the gear 58 being connected to be driven by gear 42 through shaft 62 and the gear 60 being connected to drive fly wheel 40 through shaft 44'. It will be noted that gears 50 and 58 are 90° out of phase with gears 52 and 60, respectively. When the gears 32, 34 and 42 are in the position shown, which is the same as in Figure 1, the small diameters of gears 50 and 58 will be in mesh with the large diameters of gears 52 and 60, respectively. This arrangement provides the same speed characteristics as that of Figure 1, but the arrangement of Figure 1 is preferred since it requires two less elliptical gears.

While two embodiments of my invention have been shown and described it will be apparent that other adaptations and modifications may be made without departing from the scope of the following claims.

I claim:

1. Apparatus for transmitting power between a constant speed shaft and a variable speed shaft with the speed of the constant speed shaft being midway between the maximum and minimum speeds of the variable speed shaft, said apparatus comprising two focus rotated elliptical gears in mesh with one another, means connecting the first of said focus rotated elliptical gears to one of said shafts, two center rotated elliptical gears in mesh with one another, means connecting the first of said center rotated elliptical gears to the other of said shafts, means connecting the second of said focus rotated elliptical gears to the second of said center rotated elliptical gears, said gears being so arranged that the minor axis of the first of said center rotated elliptical gears is aligned with the major axis of the second of said center rotated elliptical gears when the maximum radius of one of said focus rotated elliptical gears is in the same plane and adjacent the minimum radius of the other of said focus rotated elliptical gears.

2. Apparatus for transmitting power from a constant speed shaft to two variable speed shafts with the speed curves of the variable speed shafts being the same but 180° out of phase with one another, said apparatus comprising a first focus rotated elliptical gear, second and third focus rotated elliptical gears each in mesh with said first elliptical gear, the axes of rotation of said focus rotated gears being in a common plane, a pair of center rotated elliptical gears in mesh with one another with one being set 90° out of phase to the other, and means mechanically connecting one of the center rotated elliptical gears to one of the focus rotated gears, said gears being so arranged that the minor axis of one of the said center rotated gears is aligned with the major axis of the other center rotated gear when the maximum and minimum radii of said focus rotated elliptical gears are in said common plane with the said minimum radius of the first focus rotated elliptical gear adjacent the maximum radius of one of the second and third focus rotated elliptical gears and the maximum radius of the first gear is adjacent the minimum radius of the other of said second and third focus rotated elliptical gears.

3. Apparatus for transmitting power from a constant speed shaft to two variable speed shafts with the speed curves of the variable speed shafts being the same but 180° out of phase with one another, said apparatus comprising a first focus rotated elliptical gear, second and third focus rotated elliptical gears each in mesh with said first elliptical gear, the axes of rotation of said focus rotated gears being in a common plane, a pair of center rotated elliptical gears in mesh with one another with one being set 90° out of phase to the other, means connecting the first of said center rotated elliptical gears to the first focus rotated elliptical gears, means connecting the second of said center rotated elliptical gears to the constant speed shaft, said gears being so arranged that the major axis of said first center rotated elliptical gear is aligned with the minor axis of the second center rotated elliptical gear when the maximum and minimum radii of said focus rotated elliptical gears are in said common plane with the said minimum radius of the first focus rotated elliptical gear adjacent the maximum radius of one of the second and third focus rotated elliptical gears and the maximum radius of the first gear is adjacent the minimum radius of the other of said second and third focus rotated elliptical gears.

4. A flying shear for cutting an elongated object into short lengths comprising a rotatable shear drum, a motor for driving said drum, a fly wheel, a first focus rotated elliptical gear driven from said motor, second and third focus rotated elliptical gears each in mesh with said first elliptical gear, the axes of rotation of said focus rotated gears being in a common plane, means connecting one of said second and third focus rotated elliptical gears to said drum, means connecting the other of said second and third focus rotated elliptical gears to said fly wheel, means modifying the speed characteristics of said focus rotated elliptical gear system so that the speed curves of the drum and fly wheel are the same but 180° out of phase with one another, said last named means including a pair of center rotated elliptical gears in mesh with one another with one being set 90° out of phase to the other, and means mechanically connecting one of the center rotated elliptical gears to one of the focus rotated gears, said gears being so arranged that the minor axis of one of said center rotated gears is aligned with the major axis of the other center rotated gear when the maximum and minimum radii of said focus rotated elliptical gears are in said common plane with the minimum radius of the first focus rotated elliptical gear adjacent the maximum radius of one of the second and third focus rotated elliptical gears and the maximum radius of the first gear is adjacent the minimum radius of the other of said second and third focus rotated elliptical gears.

5. A flying shear for cutting an elongated object into short lengths comprising a rotatable shear drum, a motor for driving said drum, a fly wheel, a first focus rotated elliptical gear, second and third focus rotated elliptical gears each in mesh with said first elliptical gear, the axes of rotation of said focus rotated gears being in a common plane, means connecting one of said second and third focus rotated elliptical gears to said drum, means connecting the other of said second and third focus rotated elliptical gears to said fly wheel, a pair of center rotated elliptical gears in mesh with one another with one being set 90° out of phase to the other, means connecting the first of said center rotated elliptical gears to the first focus rotated elliptical gear, means connecting the second of said center rotated elliptical gears to said motor, said gears being so arranged that the major axis of said first center rotated elliptical gear is aligned with the minor axis of the second center rotated elliptical gear when the maximum and minimum radii of said focus rotated elliptical gears are in said common plane with the minimum radius of the first focus rotated elliptical gear adjacent the maximum radius of one of the second and third focus rotated elliptical gears and the maximum radius of the first gear is adjacent the said minimum radius of the other of said second and third focus rotated elliptical gears.

6. A flying shear for cutting an elongated object into short lengths comprising a rotatable shear drum, a motor, a fly wheel, and a connection between said motor and said drum and fly wheel, said connection including mechanical means for rotating the drum and fly wheel at variable speeds with the drum and fly wheel having like harmonic speed curves 180° out of phase with one another and the sum of the speeds of the drum and fly wheel being equal at all times.

7. A flying shear for cutting an elongated object into short lengths comprising a rotatable shear drum, a motor, a fly wheel, a first focus rotated elliptical gear driven from said motor, second and third focus rotated elliptical gears each in mesh with said first elliptical gear, the axes of rotation of said focus rotated gears being in a common plane, means connecting one of said second and third focus rotated elliptical gears to said drum, means connecting the other of said second and third focus rotated elliptical gears to said fly wheel, and means modifying the speed characteristics of said focus rotated elliptical gear system so as to obtain harmonic speed curves for the drum and fly wheel which are the same but 180° out of phase with one another, the sum of the speeds of the drum and fly wheel being equal at all times.

8. Power transmitting apparatus comprising a constant speed shaft, a first focus rotated elliptical gear connected to be driven by said constant speed shaft, second and third focus rotated elliptical gears each in mesh with said first elliptical gear, two variable speed shafts one connected to said second elliptical gear and the other connected to said third elliptical gear, the axes of rotation of said focus rotated gears being in a common plane, and mechanical means for modifying the speed characteristics of the elliptical gears so that the variable speed shafts will have like harmonic speed curves 180° out of phase with one another and the sum of the speeds of the two variable speed shafts will be equal at all times.

References Cited in the file of this patent

UNITED STATES PATENTS

| | | |
|---|---|---|
| 114,297 | Ivens et al. | May 2, 1871 |
| 314,221 | Carnahan | Mar. 24, 1885 |
| 2,131,288 | Kirkpatrick | Sept. 27, 1938 |